July 23, 1957  E. CHAPMAN  2,800,060
APPARATUS FOR SHAPING TEST SPECIMENS
Filed April 12, 1952

Inventor
EVERETT CHAPMAN
By
Synnestvedt + Lechner
Attorneys

United States Patent Office 2,800,060
Patented July 23, 1957

2,800,060

APPARATUS FOR SHAPING TEST SPECIMENS

Everett Chapman, West Chester, Pa.

Application April 12, 1952, Serial No. 282,015

3 Claims. (Cl. 90—13.2)

This invention relates to an apparatus for the shaping of test specimens and in particular, the invention is concerned with the rapid shaping of optically accurate test specimens for use in apparatus such as polariscopes.

The invention contemplates a novel arrangement of machining apparatus, for example, apparatus having high speed cutting means adapted to shape the desired profile of the test specimen from a piece of material. The invention provides for a unique arrangement for forming an assembly wherein a piece of material is secured to a templet having a profile corresponding to the desired shape of the test specimen. In the machining or cutting operation, the apparatus provides for the interengagement of the cutting means and the material, the amount of interengagement being determined by certain abutment mechanism orientated with respect to the cutting means and adapted to engage the templet whereby to condition the cutting means for shaping the article in accordance with the profile of the templet.

In stress analysis investigation where apparatus such as polariscopes are used, it is a fundamental requisite that the test specimen used in the polariscope be carefully constructed so as to have a high degree of optical accuracy. For example, the surfaces of the specimen, which are transverse to the direction of propagation of light, must be as nearly parallel to one another as possible. Furthermore, these surfaces must be substantially optically flat, highly polished, and free from imperfections, such, for example, as scratches or the like. In addition, the edges of the specimen must be parallel, i. e., perpendicular to the flat surfaces, and the corners of the specimen must be square. The reason for such requirements in the structure of the specimen is to insure that light will travel a constant thickness of material. Test specimens used in polariscopes also must be free from machining or heating stresses because the fundamental theory of the operation of the polariscope depends upon known external stresses being imposed upon the specimen. Thus, internal stresses arising in the manufacture of the specimen give rise to inaccurate and faulty results.

Heretofore, various methods for constructing test specimens for use in polariscopes have been employed. Generally, these methods comprise the laying out of the desired profile of the test specimen on the material as by scribe lines or the like. Generally, the methods for cutting out the specimen scribed on the material involve the use of cutters as employed in ordinary machine tool operations. Specimens prepared in this manner are usually subjected to a grinding or polishing operation for desirably conditioning the edges of the specimen. Furthermore, if optically accurate surfaces are to be obtained, the surface must be polished to remove imperfections due to scribe lines or clamps.

All of these methods are subject to certain inherent disadvantages. For example, the high standard of optical accuracy required necessarily makes such ordinary machining methods time consuming and expensive. For instance, special jigs and fixtures are required for both the machining and polishing operations, especially where the desired profile is substantially irregular. Furthermore, the required polishing operation is conducive in the great majority of cases to machining or heating stresses being set up in the specimen. These heating stresses must be removed before a test specimen can be used in a polariscope. This necessitates an annealing operation for removal of the stresses and this, in material such as Bakelite, for instance, required heating at a closely controlled temperature and then a cooling period of several days.

Furthermore, the ordinary method which involves the laying out of the required profile on a piece of material is undesirable because oftentimes marks or other imperfections due to the scribing operation are present on a face of the specimen which are objectionable in photoelastic work.

In addition to the above, the ordinary methods for constructing photo-elastic specimens are objectionable because the scribing, machining and polishing require a rather high degree of skill on the part of the operator.

The present invention overcomes these difficulties and consequently is of special advantage and utility in laboratories or engineering departments where stress analysis investigation is carried on with the use of such apparatus as polariscopes. The invention is particularly adaptable in such instances because the shaping of photo-elastic models may be done very rapidly and without any sacrifice of optical accuracy. The invention provides for the shaping of models which are free from imperfections due to layout lines or the like. In addition, the test specimens are free from machining or heat stresses and consequently, require no special treatment such as annealing.

According to the invention, the cutting means comprises a cylindrically shaped tungsten carbide cutter having cutting edges disposed around the surface of the cylinder so that the locus of the edges is parallel to the rotational axis of the cutter. The cutter is adapted to be attached to a spindle which is driven by a high-speed motor. For reasons explained hereinafter, the cutter is driven at a very high speed and has a substantially large number of cutting edges. This assembly is mounted so that the axis of the cutter, and hence, the cutting edges, are perpendicular to a flat work surface of a work-supporting table. The lower end of the cutter is disposed somewhat above the top of the work surface. In the work table, directly below the cutter, is a threaded hole which accommodates the insertion of certain plugs from the underside of the table. When a plug is inserted into the work table, a certain portion of the plug extends above the work surface so that the topmost portion of the plug is in a desired spaced-apart relation to the bottom part of the cutter. This extension of the plug above the work surface provides an abutment which is cylindrical in shape with the sides perpendicular to the work surface, hence, parallel to the cutting edges. The axis of the abutment and the axis of the cutter are colinear.

As has been mentioned heretofore, the invention contemplates the shaping of a test specimen from a templet having the desired profile. Ordinarily, such templets have two flat sides which are parallel to one another and the edges of the templet are perpendicular to the sides. A piece of material from which the test specimen or model is to be shaped is attached to one flat side of the templet by pieces of thin tape having adhesive material on both sides. The use of such tape preserves the surface of the material because no mechanical clamping of the material to the templet is required.

The assembly, with the templet side down, is placed on the work surface. The amount by which the abutment extends above the work surface is exactly equal to the thickness of the templet. The distance separating the top of the abutment and the lower part of the cutter is slightly less than the thickness of the tape securing the templet and material together.

The assembly is periodically urged against the cutter to remove material until such time as the templet engages the abutment, and the cutting operation is carried out until the material has the same shape as the templet.

In the preferred form, the machining operation is initially carried out in conjunction with a plug having a diameter somewhat greater than the diameter of the cutter. The effect of this is to form a rough specimen, that is to say, one having the same general profile as the templet but of larger cross sectional area. After the rough model has been shaped, a plug having the same diameter as the cutter is inserted and the machining operation is carried out to form a specimen with an identical profile as the templet.

When the test specimen has been desirably shaped, it is removed from the templet by separating the two elements. The use of the double-sided adhesive tape makes this operation simple and convenient and no marks are left on the specimen.

With the above-described arrangement, a specimen of desired shape is made without necessitating any layout lines on the material and no mechanical clamping of the specimen during the machining operation. Thus, specimens are produced without surface flaws. In addition, the use of high-speed cutters having a large number of cutting edges enables a clean cutting operation. There is no rubbing or burning of the material, consequently, specimens are produced free of heat stresses.

Furthermore, the arrangement of the cutter, abutment and templet makes for fool-proof operation. Consequently, the operator needs no special skill to produce perfect specimens.

Also, the assembly of the templet and material is accomplished in a matter of minutes.

The novelty and utility of the present invention will be more readily apparent from the following description and drawings, wherein.

Figure 1:
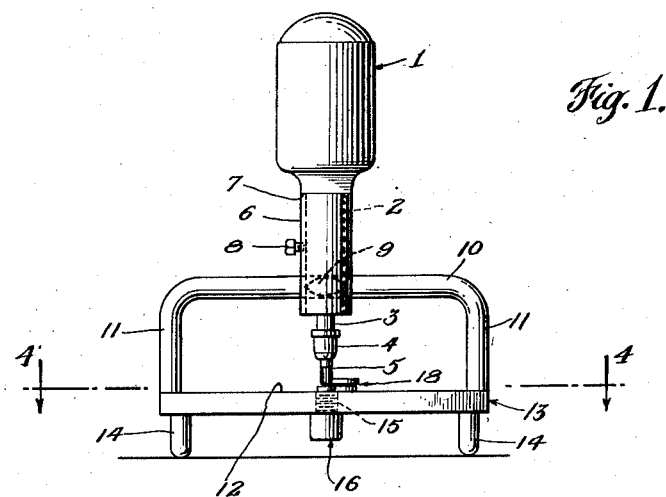
Figure 1 is a front elevation view of apparatus constructed in accordance with the invention.

The general arrangement of the equipment of the present invention is shown in Figure 1. A drive motor (not shown) is disposed within motor housing 1, having a downwardly extending portion 2, enclosing bearings for supporting the motor-driven shaft 3. At the end of shaft 3 is located a spindle 4, which provides a detachable support for cutter 5.

In the preferred form, the drive motor is an A. C. type designed to operate at about 22,000 R. P. M. The cutter 5 is generally cylindrical in shape and has 48 tungsten carbide teeth. The teeth, which effectively form the cutting edge, are arranged about the surface of the cutter so that the locus of the edges is substantially parallel to the axis of the cutter.

The downwardly extending portion of the motor housing is adapted to fit into the tubular support 6, with the top portion of the support abutting a shoulder 7 on the motor housing. The housing is secured in the support 6 by means of the set screw 8. In this arrangement, the axis of the tubular support and the axis of the cutter are substantially parallel.

The tubular support 6 is secured in the undercut 9 in U-shaped bracket 10 as by brazing. The assembly is constructed so that the axis of the tubular bracket is parallel to the median plane through the U-shaped bracket and also parallel to the legs 11—11 of the bracket. The bracket 10 is secured at right angles to the flat work surface 12, on work table 13, i. e., so that the median plane of bracket 10, hence, the axis of cutter 5, is perpendicular to the work surface.

The legs 14, which are attached to the underside of the flat work surface 12, provide a means for supporting the apparatus on a bench or the like.

Figures 2, 3, 4:
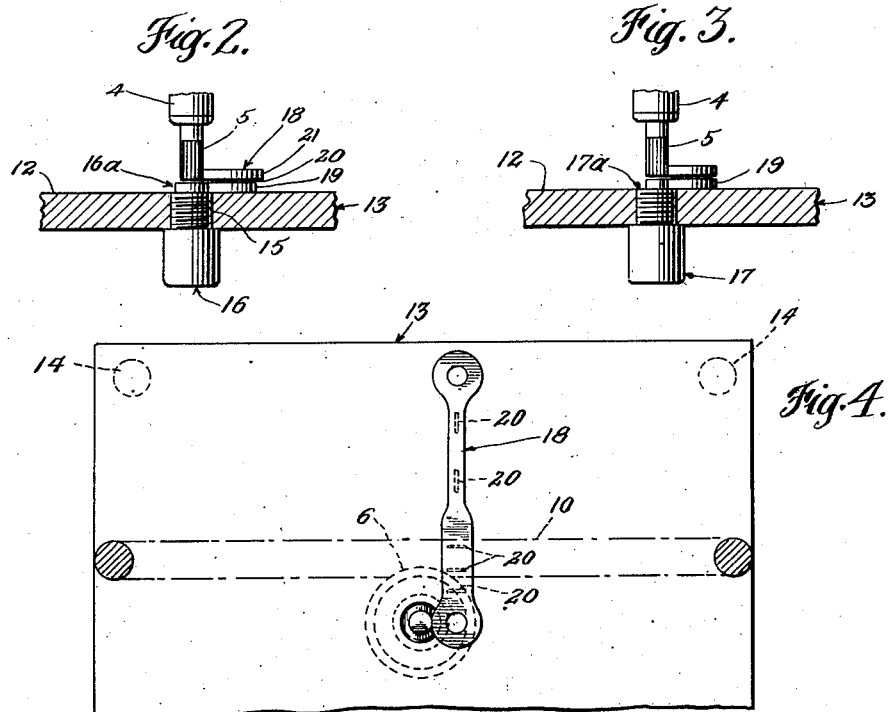
Figure 2 is a fragmentary view of the apparatus of Figure 1 showing the relation of certain components during the machining operation.
Figure 3 is another fragmentary view of the apparatus of Figure 1 showing the relationship of certain components during the machining operation.
Figure 4 is a plan view taken on lines 4—4 of Figure 1.

As best seen in Figure 2, a threaded hole 15 is located directly below the cutter 5 in work table 13, which accommodates insertion of certain plugs, such as plug 16. When a plug such as 16 is inserted in the threaded hole, the axis of the plug and the axis of the cutter are colinear. The top side of the plug 16, which is cylindrical in shape, protrudes a predetermined amount above the flat work surface 12 to form an abutment 16a, which is adapted to engage a templet 17. The cylindrical surface of the abutment is disposed at right angles to the work surface 12. As is seen in Figure 2, the top side of the abutment 16a and the underside of the cutter 5 are disposed in spaced-apart relationship, the nature of the relationship will be described in connection with the description of Figure 3. As will be apparent from an inspection of Figure 2, the diameter of the abutment 16a is somewhat greater than the diameter of the cutter. Ordinarily, the differential in diameter is about .015 inch. This latter dimension is given by way of example and not by way of limitation.

A plug 17, which is similar to plug 16, is shown in Figure 3. The difference in these plugs is that the diameter of the abutment 17a is made exactly equal to the diameter of the cutter 5. How the plugs 16 and 17 are utilized will be described hereinafter in connection with the description of the machining operation.

The assembly 18, which is used in the cutting operation, consists of a templet 19, adhesive material 20, and a blank of specimen material 21.

The templet 19 serves both as a means of obtaining the desired profile of the test specimen, and also serves as a means of supporting the specimen during the machining operation. Ordinarily, such templets are made of aluminum or brass, about $\frac{1}{16}''$ thick. In addition to having the desired profile, it is necessary that such templets have two flat sides which are parallel to one another and edges which are perpendicular to the sides and also square. A blank piece of birefringent material 21, having a cross sectional area greater than the cross sectional area of the templet is secured to one of the flat sides. To secure the blank and the templet together, I use several small pieces of material 20, having an adhesive substance on both sides. These pieces, such as those shown by numeral 20 on Figure 4, are appropriately placed on one side of the templet, and then the blank is positioned over the templet. The assembly is then firmly pressed together.

The construction of the above-described assembly has the advantage of being very rapid, but in addition, the construction is conducive to other advantages. For example, since the templet has the same profile as the specimen desired, the shaping operation may be done without marking or scribing the desired shape of the specimen on the blank. Furthermore, the adhesive means for securing the templet and the blank together does away with the necessity of mechanical clamps because the bond between the blank and the templet is sufficiently strong to firmly hold the elements together during the shaping or cutting operation. With layout lines and clamps avoided, the surface of the specimen is inherently free from flaws or other imperfections, and, therefore, polishing of the surfaces and annealing of the specimen is not required. In addition, I have found that after the specimen has been shaped and the two elements separated, no marks from the adhesive are left on the surface.

The procedure for cutting the shape of the test specimen involves the making of a rough specimen and then finishing this unit to desired shape. To make the rough specimen, a plug such as 16, having an abutment with a diameter greater than the diameter of the cutter, is inserted into the work table. The cutter motor is energized and then the templet and blank assembly is placed on the work surface 12, with the templet side down. The work surface serves as a support and a guide for the assembly during the cutting operation.

The technique involved in the cutting or shaping operation is to urge the assembly toward the cutter so that the blank and the cutter interengage. The assembly is repeatedly urged toward the cutter in a light but firm skimming or sweeping manner. The cutting operation is performed over the periphery of the blank.

From an inspection of Figure 3, it will be apparent that the assembly may be urged toward the cutter only so far as permitted by the point of engagement between an edge of the templet and the cylindrical surface of the abutment. It will be noted that the cutter has penetrated into the material to a distance somewhat beyond the upwardly projected edges of the templet. Thus, a "rough" specimen whose profile is similar to the profile of the templet but whose cross sectional area is greater than that of the templet is produced.

After the rough specimen has been completed, the plug 16 is removed, and the plug such as 17 is inserted. It will be recalled that the diameter of the abutment 17a and the diameter of the cutter are exactly equal, and that the axis of the abutment and the axis of the cutter are co-linear. Therefore, as the assembly is urged toward the cutter, the cutter is permitted to engage the blank and remove the material until the final cutting is accomplished at points coincident with the upwardly projected edges of the templet. Thus, a test specimen is made whose profile and cross sectional area are identical to those of the templet.

In connection with Figure 3, it is to be observed that when the abutment and the templet are engaged, the cutter does not make contact with the templet because the height of the abutment is made exactly equal to the thickness of the templet, the distance between the top of the abutment and the lower part of the cutter is somewhat less than the thickness of the adhesive material.

After the test specimen has been shaped, the specimen and the templet are pulled apart, and the specimen is then ready for use.

The above-described operation enables the rapid production of a test specimen, having optical characteristics entirely suitable for use in machines such as polariscopes. As mentioned above, neither mechanical clamps or layout or scribe lines are required so that optical surfaces are made which are free from imperfections and polishing or annealing operations are not required. With the cutter rotating at a very high speed and having a large number of cutting edges, the shaping of the birefringent material in the manner described is done without developing heating or machining stresses. Furthermore, the high speed cutting makes edges which are square and free from burrs. It will be noted that the edges are automatically made perpendicular to the surfaces of the specimen, since the cutter axis is perpendicular to the table work surface.

I claim:

1. Apparatus for shaping photoelastic specimens comprising: a rotatable cutter generally cylindrical in shape and having a plurality of cutting teeth arranged on the surface whereby the locus of the edges is substantially parallel to the axis thereof; a work table having a flat surface arranged substantially perpendicular to the axis of the cutter; a plurality of cylindrically-shaped different diametered abutments each being selectively insertable in said table to extend upwardly substantially at right angles to the flat surface thereof, the extension of each abutment above said flat surface being substantially the same and the axis of the cutter and the axis of an abutment being substantially coincident; a templet having two flat parallel sides and a peripheral edge substantially perpendicular thereto, the width of the peripheral edge being substantially the same as the extension of an abutment above said flat work surface, one flat side of the templet being in sliding contact with the flat surface of the work table whereby the templet is movable thereover; and means to secure a piece of specimen material to the templet including a piece of tape having adhesive material on opposite sides thereof, one side being secured to said templet.

2. A construction in accordance with claim 1 wherein there are 48 tungsten carbide cutting teeth and further including means to drive the cutter substantially at 22,000 R. P. M.

3. Apparatus for shaping photoelastic specimens comprising: a rotatable cutter generally cylindrical in shape and having a plurality of cutting teeth arranged on the surface whereby the locus of the edges is substantially parallel to the axis thereof; a work table having a flat surface arranged substantially perpendicular to the axis of the cutter; a plurality of cylindrically-shaped different diametered abutments; means cooperating with said work table and said cutter for selectively aligning the axis of an abutment and the axis of the cutter wherein said abutment extends upwardly and substantially at right angles to the flat surface of the table; a templet having two flat parallel sides and a peripheral edge substantially perpendicular thereto, the width of the peripheral edge being substantially the same as the extension of an abutment above said flat work surface, one flat side of the templet being in sliding contact with the flat surface of the work table whereby the templet is movable thereover; and means to secure a piece of specimen material to the templet including a piece of tape having adhesive material on opposite sides thereof, one side being secured to said templet.

References Cited in the file of this patent

UNITED STATES PATENTS

| Number | Name | Date |
|---|---|---|
| 824,952 | Royle | July 3, 1906 |
| 1,423,154 | Rosak | July 18, 1922 |
| 2,206,942 | Cook | July 9, 1940 |
| 2,230,292 | Faso | Feb. 4, 1941 |
| 2,240,685 | Bond | May 6, 1941 |
| 2,317,616 | Jones | Apr. 27, 1943 |